United States Patent [19]

Imazeki et al.

[11] 4,424,569
[45] Jan. 3, 1984

[54] METHOD AND APPARATUS FOR A NUMERICAL CONTROL DEVICE FOR CONTROLLING A MACHINING DEVICE HAVING A PLURALITY OF TOOLS

[75] Inventors: Ryoji Imazeki; Hiroomi Fukuyama; Yoshimasa Kagawa, all of Hachioji, Japan

[73] Assignee: Fujitsu Fanuc Ltd., Tokyo, Japan

[21] Appl. No.: 283,349

[22] Filed: Jul. 14, 1981

[30] Foreign Application Priority Data

Jul. 24, 1980 [JP] Japan .................................. 55-101521

[51] Int. Cl.$^3$ ...................... G05B 19/417; G05B 11/32
[52] U.S. Cl. .................................... 364/474; 364/468; 364/167; 364/169; 318/625; 318/567
[58] Field of Search ............... 364/474, 142, 167, 169, 364/468, 190, 900; 318/625, 562, 567, 568, 569

[56] References Cited

U.S. PATENT DOCUMENTS

| | | | |
|---|---|---|---|
| 3,763,360 | 10/1973 | Nishimura et al. | 318/625 |
| 3,793,625 | 2/1974 | Pomella et al. | 364/900 |
| 3,818,301 | 6/1974 | Sindelar | 318/625 |
| 3,825,731 | 7/1974 | Kobayashi et al. | 318/569 |
| 4,060,851 | 11/1977 | Nakatsukasa et al. | 364/900 |
| 4,092,720 | 5/1978 | Carey | 364/474 |
| 4,257,103 | 3/1981 | Suzuki et al. | 364/474 |

*Primary Examiner*—Jerry Smith
*Assistant Examiner*—Jameson Lee
*Attorney, Agent, or Firm*—Staas & Halsey

[57] ABSTRACT

A method and apparatus for numerically controlling a machine tool having at least two tools which are arranged to move in unison with a constant position relationship with respect to one another, the tools being moved relative to a workpiece in accordance with absolute commands to machine a workpiece in a prescribed manner. A single current position register, comprising a section for storing X coordinates and a section for storing Z coordinates, is provided to store the current position of a first tool. Further provided are arithmetic means, responsive to a command for setting coordinates, for computing the current position of a second tool, as well as pulse distribution means. The method includes the steps of storing the position of the first tool in the current position register prior to machining the workpiece with the first tool, moving the first tool to machine the workpiece in accordance with the current position and an absolute command, computing the current position of the second tool via the arithmetic means in response to the command for setting coordinates to change control from the first tool to the second tool, storing the computed current position in the current position register, and moving the second tool to machine the workpiece in accordance with the content of the current position register and an absolute command.

7 Claims, 8 Drawing Figures

| Machining Program | Contents of Current position Registors (X) , (Z) | Position of tool TL1  X1    Z1 | Position of tool TL2  X2 , Z2 |
|---|---|---|---|
| N1  G 50<br>X 200<br>Z 400 * | (X) = 200<br>(Z) = 400 | X1 = 200<br>Z1 = 400 | X2 = 190<br>Z2 = 500 |
| N2  X 100<br>Z 200 * | (X) = 100<br>(Z) = 200 | X1 = 100<br>Z1 = 200 | X2 = 90<br>Z2 = 300 |
| N3  X 150<br>Z 300 * | (X) = 150<br>(Z) = 300 | X1 = 150<br>Z1 = 300 | X2 = 140<br>Z2 = 400 |
| N4  G 50<br>U -10<br>W 100 * | (X) = 140<br>(Z) = 400 | X1 = 150<br>Z1 = 300 | X2 = 140<br>Z2 = 400 |
| N5  X 100<br>Z 200 * | (X) = 100<br>(Z) = 200 | X1 = 110<br>Z1 = 100 | X2 = 100<br>Z2 = 200 |
| N6 | ⋮ | ⋮ | ⋮ |

METHOD AND APPARATUS FOR A NUMERICAL CONTROL DEVICE FOR CONTROLLING A MACHINING DEVICE HAVING A PLURALITY OF TOOLS

BACKGROUND OF THE INVENTION

This invention relates to a numerical control, (NC), method and apparatus. More particularly, to a numerical control method and apparatus for a machine tool of the type having a plurality of tools, which move in unison with a fixed positional relationship with respect to one another, are moved on the basis of absolute commands, a workpiece being machined successively by selected ones of the tools.

A machine tool such as a lathe has a plurality of tools firmly mounted on a tool rest. To execute a machining operation, desired ones of these tools are selected depending upon whether rough or fine cutting is required. Turning and drilling tools and the like can also be selected as the machining operation progresses.

A machining program tape for a machine of the described type ordinarily includes a mixture of position commands for the various tools. It is advantageous, for programming, if the position commands are expressed as absolute commands. This is because entering the coordinates of the position to which a tool is to be moved by the command, is a very simple operation for the programmer. To make this possible, the numerical control device is adapted to internally compute an incremental value, namely the difference between the current position of the tool and the position to which the tool is to be moved, and to execute a pulse distributing operation on the basis of the incremental value. In other words, when an absolute command is issued the numerical control device must continuously sense the current position of the tool. To this end, the following three numerical control methods have been proposed with for controlling a machine tool of the type having a plurality of tools having different coordinates, and where the desired tools are selected as machining progresses, to subject a workpiece to a number of machining operations such as turning and the like. The three methods are:

(1) providing a current position register for each of the tools, and computing the incremental value from the value specified by the absolute command and the data stored in the current position register of the selected tool;

(2) providing a single current position register, and restoring a second tool to a specified position, such as reference point, to clear the content of the register before the second tool is to machine the workpiece and after machining by the first tool has been completed; and (3) providing a single current position register, and entering the current position of a second tool, by means of a keyboard or the like, before the second tool is to machine the workpiece and after the machining by the first tool has been completed.

Since all of the tools move in unison, method (1) is disadvantageous because the current positions of each of the plurality of tools must be computed and stored in the registers whenever the tools are moved. This requires considerable time for computations, leading to a decline in machining efficiency. With method (2), a return to the reference point is required each time a tool is changed. This lengthens machining time and seriously lowers machining efficiency. Method (3) requires that the operator manually calculate and enter the current position of the new tool whenever tools are changed. This is a time-consuming and troublesome operation.

BRIEF SUMMARY OF THE INVENTION

Accordingly, an object of the present invention is to provide a numerical control method and an apparatus for a numerical control device controlling a machine tool having a plurality of tools for selectively machining a workpiece, such that the method and apparatus require only a current position register for one tool and maintain machining efficiency.

Another object of the present invention is to provide a numerical control method and apparatus which decrease the current position computation time and allow the NC unit enough time to perform various numerical control treatment.

Other features and advantages of the present invention will be apparent from the following description taken in conjunction with the accompanying drawings.

DESCRIPTION OF THE PREFERRED EMBODIMENT

Figures 1, 3:
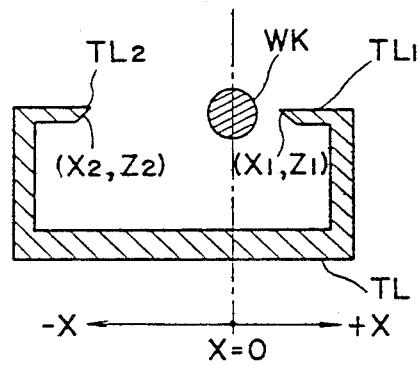
FIG. 1 illustrates the positional relationship between a workpiece and the tools.
FIG. 3 shows the relationship between the contents of a current position register and the tool positions for each step of a machining program.

Referring first to FIG. 1, a workpiece WK having the shape of a round bar is fixed rigidly by means of a chuck provided on a lathe, neither the chuck nor the lathe are shown in the drawing. The center line of the workpiece WK lies on a line with an X coordinate X=0 as shown in FIG. 1. Secured to a tool holder TL on either side of the workpiece WK are two tools $TL_1$ and $TL_2$. Since the tools $TL_1$ and $TL_2$ are fixed to the same tool holder TL, moving the tool holder to bring one of the tools into use, causes the other tool to follow the movement of the first. Thus, a fixed positional relationship is maintained between the two tools at all times. In other words, the spacing between the noses of the two tools, as projected on the X-axis, and as projected on the Z-axis is constant. Accordingly, letting the coordinates $(X_1, Z_1)$ and $(X_2, Z_2)$ represent the tool nose positions of the respective tools $TL_1$, $TL_2$ the relationships $$X_1 - X_2 = u \text{ (constant)}$$

$$Z_1 - Z_2 = w \text{ (constant)}.$$

will hold at all times.

In accordance with the present invention, only one current position register is provided, and the arrangement is such that when machining with one tool, say tool $TL_1$, is completed, the operations $$X_1 - u \rightarrow X_2$$

$$Z_1 - w \rightarrow Z_2$$

are performed before machining by the tool $TL_2$ starts. The result of these operations provides the current position $(X_2, Z_2)$ of the nose of tool $TL_2$. It should be noted that the current position $(X_1, Z_1)$ of the tool $TL_1$ is stored in the current position register as long as tool $TL_1$ is being used.

When machining with the other tool $TL_2$ is completed, the operations $$X_2 - u \rightarrow X_1$$

$$Z_2 - w \rightarrow Z_1$$

are performed before machining with the tool $TL_1$ begins. The result of these operations provides the current position $(X_1, Z_1)$ of the nose of tool $TL_1$. The current position $X_2, Z_2$ of the tool $TL_2$ is stored in the current position register as long as tool $TL_2$ is the being used. The changeover from one tool to the other is performed by a G-function command (G50 in FIG. 3) for setting coordinates, the command being included in the machining program.

Figure 2:
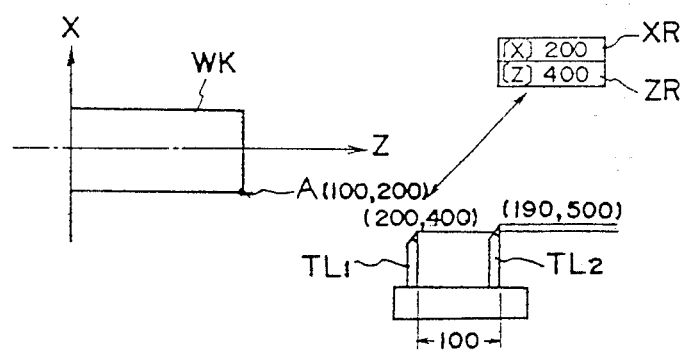
FIGS. 2(A) through 2(E) illustrate a numerical control method in accordance with the present invention.
Figure 2:
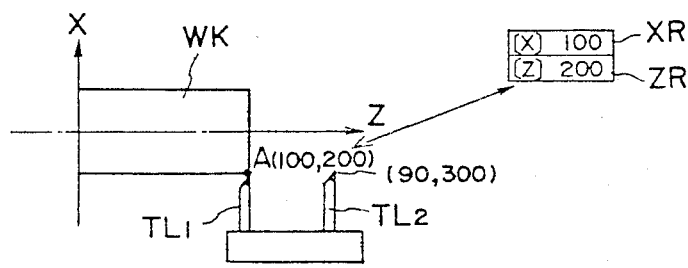
Figure 2:
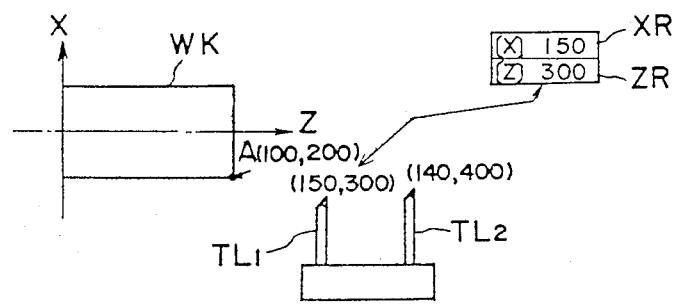
Figure 2:
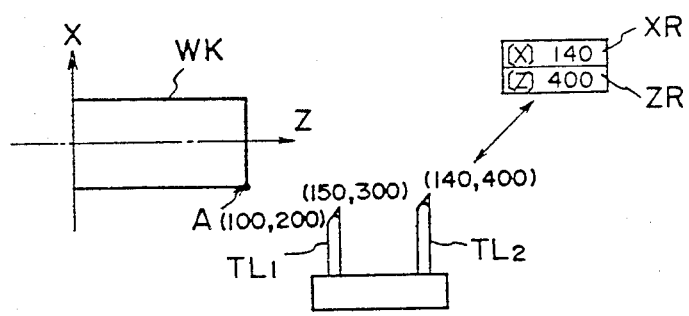
Figure 2:
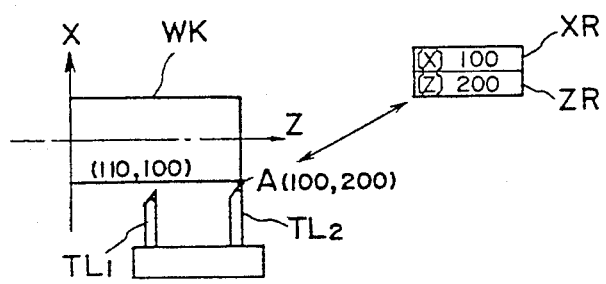

The views of FIG. 2 illustrate the numerical control method of the present invention. Specifically, FIG. 2(A) shows the positional relationship between the workpiece WK and the tools $TL_1$, $TL_2$ as well as the contents of the current position register, immediately after coordinates have been set. FIG. 2(B) shows the machine status following positioning at a machining position (point A). FIG. 2(C) shows the machine status following a retraction operation, FIG. 2(D) shows the machine status following setting of coordinates, and FIG. 2(E) shows the machine status following positioning at the machining position (point A). The table in FIG. 3 shows the command data for each step of a machining program stored on a recording medium such as an NC tape, the content of the current position register following the execution of the program steps, and the current positions of the tools $TL_1$, $TL_2$.

In FIG. 2, XR and ZR denote current position register sections for the X- and Z-axes, these register sections constituting a single register unit. The distance between the nose of the tool $TL_1$ and the nose of the tool $TL_2$ is 10 along the X-axis, and 100 along the Z-axis, these distances are constant as mentioned above. In the machining program column of FIG. 3, $N_i$ ($N_1$, $N_2$ ... ) denotes a sequence number, i.e., G50 denotes a preparatory function command for setting coordinates. Also, the values X 0 ... 0 and Z 0 ... 0 denote absolute values along the X- and Z-axes, respectively, and U 0 ... 0, W 0 ... 0 denote incremental values along the X- and Z-axes, respectively. When absolute values follow the G50 command, such as when G50X n Z m* is commanded, the command data presets the current position registers XR, ZR to the numerical values which follow the letters X and Z, thereby establishing the coordinates. When incremental values follow the G50 command, such as when G50 U n W m is commanded, the command data presets the current position registers XR and ZR to the values $[X]+U$, $[Z]+W$, thereby establishing the coordinates, wherein $[X]$ and $[Z]$ represent the contents of the X-axis and Z-axis registers, respectively.

Before the command data is read in, the tool $TL_1$ is positioned at the location specified by $X_1=200$, $Z_1=400$, by a manual operation or the like. The command data at sequence number $N_1$ of the machining program is now read in from the numerical control device, whereupon the values 200 and 400 are preset in the current position registers XR and ZR, respectively. In other words, the above operation sets the coordinates $(X_1, Z_1)$ of the tool $TL_1$ in the respective current position registers XR and ZR. The coordinates of the tool $TL_2$ at this time are $X_2=190$, $Z_2=500$, as shown in FIG. 2(A).

Next, under the control of the numerical control device, the tool $TL_1$ is moved toward the machining point A (by moving the tool holder) in accordance with the command data at sequence number $N_2$, until it is positioned at the point A, as shown in FIG. 2(B). The position of tool $TL_1$ is now given by $X_1=100$, $Z_1=200$, and that of tool $TL_2$ is given by $X_2=90$, $Z_2=300$. The contents $[X]$, $[Z]$ of the respective current position registers XR, ZR indicate the current position of the tool $TL_1$, namely $[X]=100$, $[Z]=200$.

The workpiece WK is now machined by the tool $TL_1$ under the control of the numerical control device, this operation is not described here. Following machining, the tool holder is retracted in accordance with the command data at sequence number $N_3$. After retraction, as illustrated in FIG. 2(C), the position of tool $TL_1$ is $X_1=150$, $Z_1=300$, and that of tool $TL_2$ is $X_2=140$, $Z_2=400$. The contents $[X]$, $[X]$ of the registers XR and ZR indicate the current position of the tool $TL_1$, namely $[X]=150$, $[Z]=300$. When the command data at sequence number $N_4$ is read in under these conditions, the preparatory function command $G_{50}$ for setting coordinates causes arithmetic means (not shown) to perform the operations $$[X]+u \rightarrow [X]$$

$$[Z]+w \rightarrow [Z]$$

using the numerical values u, w ($u=-10$, $w=100$) that follow the letters U, W, respectively, as well as the contents $[X]$, $[Z]$ of the current position registers XR and ZR. The results of the operations are stored in the shift registers XR and ZR, as shown in FIG. 2(D). Thus, the command data stored at sequence number $N_4$ causes the coordinates $X_2, Z_2$ of tool $TL_2$ to be stored in the current position registers XR and ZR.

The command data at sequence number $N_5$ is read in next. The tool $TL_2$, being carried by the tool holder, approaches to the machining point A and stops when positioned at point A, as depicted in FIG. 2(E). The position of tool $TL_1$ is now given by $X_1=110$, $Z_1=100$, and that of tool $TL_2$ is given by $X_2=100$, $Z_2=200$. The contents of registers XR and ZR indicate the current position of the nose of tool $TL_2$, namely $[X]=100$, $[Z]=200$. From this point on, the information stored in the current position registers indicates the current position of tool $TL_2$ until the preparatory function command G50 for setting coordinates appears in the machining program. To set the current position of the tool $TL_1$ in the current position registers XR and ZR, the command G50 U 10 W-100* for setting coordinates need only be included in the machining program.

In the foregoing description, $X_1=200$, $Z_1=400$ indicated the initial position of the nose of tool $TL_1$. However, it is also possible to set $X_1$ and $Z_1$ equal to zero ($X_1=Z_1=0$, indicating the origin), and to provide a function that restores the tool $TL_1$ to the origin at the beginning of the machining operation.

Figure 4:
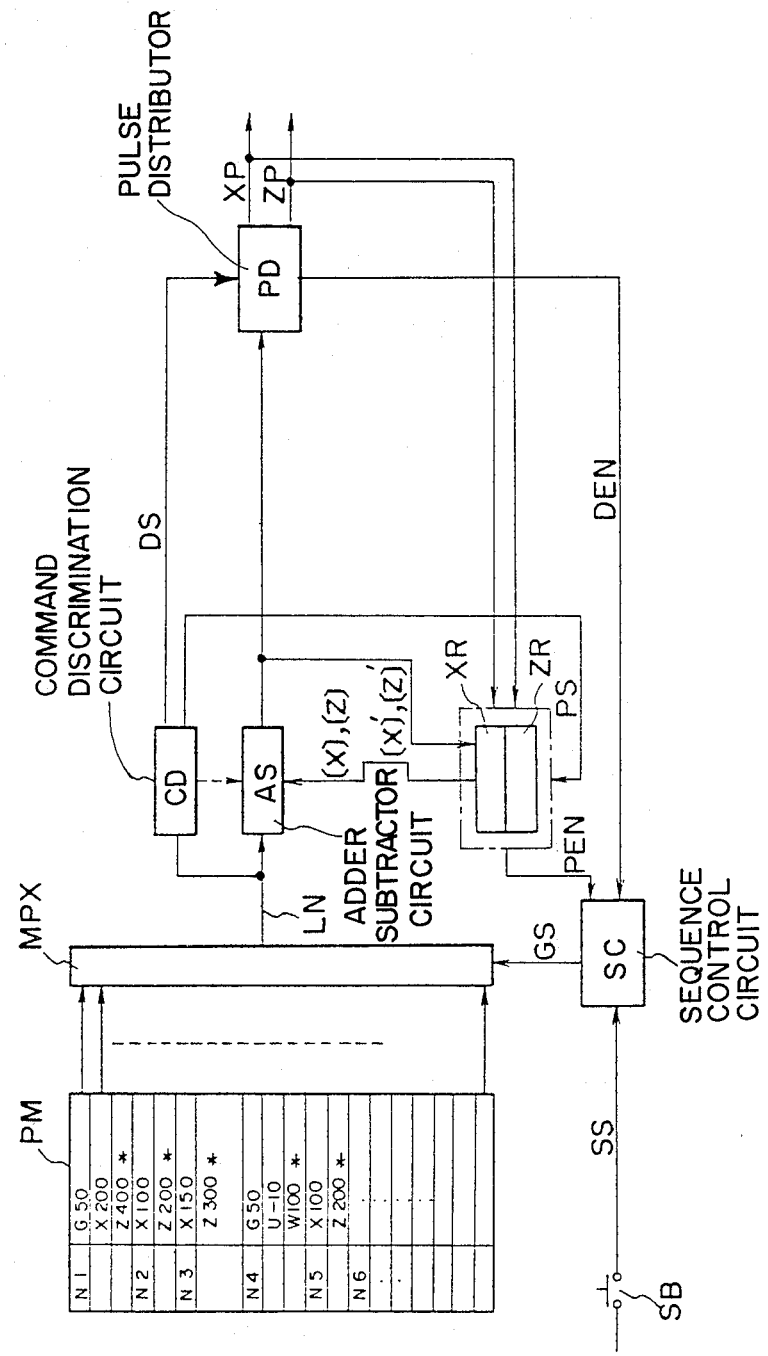
FIG. 4 is a block diagram of a numerical control device for practicing the numerical control method of the present invention.

FIG. 4 is a block diagram of a numerical control device for practicing the method of the present invention. A program memory PM sequentially stores the machining data, e.g., that shown in FIG. 3, starting from the sequence number $N_1$. This is accomplished by means of a tape reader which reads in the machining data from a paper tape, neither the tape reader nor the paper tape being illustrated in the drawings. A multiplexer MPX selects the delivers predetermined machining data from the program memory PM under a control of a sequence control circuit SC. The sequence control circuit SC includes a counter whose content is advanced by, for example, a preset end signal (i.e., a signal indicating the completion of a presetting operation) and a pulse distribution end signal (i.e., a signal indicating the completion of a pulse distribution operation). The sequence control circuit is arranged such that command data is delivered from the program memory PM through the multiplexer MPX in the order indicated by the sequence numbers and in accordance with the contents of the counter. The sequence controller SC is actuated by a start button SB. A command discrimination circuit CD produces a preset signal PS that presets the result, of an operation performed by an adder-subtractor AS, into the current position registers XR and ZR in response to the preparatory function command G50 for setting coordinates. The circuit CD also produces a distribution start signal DS when the command data is a position command. The adder-subtractor circuit AS performs predetermined arithmetic operations in accordance with whether the input received from the multiplexer MPX is an incremental command or an absolute command. For example, when the command is an absolute position command (the absolute command being expressed by the numerical values which follow the letters X and Z), the adder-subtractor circuit AS performs the operations $$X-[X] \text{ and } Z-[Z] \qquad (1)$$

to compute an incremental value which is delivered to a pulse distributor, described below. When the command is an absolute command for setting coordinates, the adder-subtractor circuit performs the operations given in (1) above (where $[X]=[Z]=0$), but the results are preset in the current position registers. When the command is an incremental command for setting coordinates (the incremental command being expressed by the numerical values which follow the letters U, W), the adder-subtractor circuit AS performs the operations $$U+[X] \text{ and } W+[Z] \qquad (2)$$

with the results of the operations (indicating the current position of the tool to be used) being preset in the current position registers XR and ZR.

The pulse distributor, denoted by PD in FIG. 4, is well-known and performs a pulse distribution operation to produce pulses XP and ZP that are applied to X-axis and Z-axis servo control systems (not shown). The servo control systems respond by moving the tool holder along the X- and Z-axis.

With reference to FIGS. 2 through 4 the system operation is described below. First, the start button SB is depressed under the conditions shown in FIG. 2(A). This results in the generation of a start signal SS which is applied to the sequence controller SC to start the controller. The controller responds by sending a gate signal GS to the multiplexer MPX. The MPX, in response to the gate signal, applies to line LN, the command data stored at the sequence number $N_1$. This data is the absolute data for setting coordinates and is discriminated as such by the command discrimination circuit CD which consequently delivers the preset signal PS to the current position registers XR and ZR. Meanwhile, the adder-subtractor circuit AS performs the operations given in (1) above, (where the contents [X], [Z] of the current position registers XR and ZR are initially both zero). The results of these operations, namely [X'] and [Z'], are preset into the position registers XR and ZR by the preset signal PS. Following the completion of the presetting operation, the current position register unit, comprising registers XR and ZR issues a preset end signal PEN which increments, by one count, the counter included within the sequence control circuit SC. The counter is not shown in the drawings. The result of this operation is that the multiplexer MPX applies, to line LN, the command data stored at sequence number $N_2$.

Since the command data stored at sequence number $N_2$ is the absolute position command, the adder-subtractor circuit AS immediately performs the operations given in (1) above and delivers the results, which are incremental values, to the pulse distributor PD. Meanwhile, the fact that the data is a position command is discriminated by the command discrimination circuit CD which sends a pulse distribution start signal DS to the pulse discriminator circuit PD. The latter circuit responds by performing a pulse distribution operation in accordance with the abovementioned incremental values. Thus, distributed pulses XP and ZP are generated to move the tool in the X- and Z-directions. The pulses XP and ZP are applied to the servo systems (not shown) to drive the tool holder, and to the current position registers XR and ZR which are incremented by +1 or decremented by −1 by each pulse, in accordance with the direction of tool holder movement. Thus, the current position registers XR and ZR always store the current position of one of the tools.

Following completion of the pulse distribution operation the nose of tool $TL_1$ will be at the machining position A, as shown in FIG. 2(A), and the current position of the tool $TL_1$ (actually the position of the tool nose, or the coordinates of the point A) will have been stored in the current position registers XR and ZR. After completing the pulse distribution operation, the pulse distributor issues the distribution end pulse, DEN, which increments the content of the counter contained in the sequence control circuit SC by 1. As a result, the multiplexer MPX applies to the line LN, the command data stored at sequence number $N_3$. The command data stored at sequence number $N_3$ is an absolute position command, as in the immediately preceding case just described, thus, the circuitry operates similarly. Again, the pulse distributor circuit PD issues a distribution end pulse DEN after completing the pulse distribution, and the content of the counter in the sequence control circuit SC is advanced by +1. When this occurs, the multiplexer delivers the command data stored at the next sequence number, which is $N_4$. Since this data is an incremental command for setting coordinates, the command discrimination circuit CD issues the preset signal PS and sends an add signal to the adder-subtractor circuit AS, causing the AS circuit to execute the arithmetic operations given in (2) above. The result of these arithmetic operations is the current position of the tool $TL_2$, that is, the current position of the nose of the tool. This position is preset in the current position registers XR and ZR by the preset signal PS. The adder-subtractor circuit AS issues the preset end signal PEN, which advances the counter in the sequence control circuit SC one step, so that the multiplexer MPX now delivers the command data stored at sequence number $N_5$. Machining progresses as the foregoing steps are repeated. It should be noted that the current position of the tool $TL_2$ is stored in the current position registers XR and ZR until a command for setting coordinates appears in the machining program.

In accordance with the present invention as described above, current position registers need not be provided for each of the tools mounted on a tool holder, and the tools need not be brought to a specified position when tools are changed. The result is a marked increase in machining efficiency. Moreover, since it is not necessary to manually calculate and to manually enter the current position of a new tool each time a tool is changed, it is possible to provide a numerical control device which is very simple to operate.

While the preferred embodiment described above employs a sequence control circuit to read the command data, the present invention is not limited to such an arrangement; a microprocessor can be substituted for the sequence control circuit. Furthermore, the present invention is not limited to an arrangement having only two tools; three or more tools may be provided. Finally, the changes in the coordinate values U, W need not necessarily be entered by the command data which follows the G50 command, as described above. The tool distances can be stored in memory separately in advance.

As many apparently widely different embodiments of the present invention can be made without departing from the spirit and scope thereof, it is to be understood that the invention is not limited to the specific embodiment thereof except as defined in the appended claims.

What we claim is:

1. A method of numerically controlling a machine tool being operatively connected to receive, from a numerical control apparatus, absolute positional and coordinate setting command signals, and incremental coordinate command signals, the machine tool being operatively connected to a pulse distribution circuit, a current position register operatively connected to the pulse distribution circuit, an arithemetic means operatively connected to the pulse distribution circuit and to the current position register, and said machine tool having at least two tools operatively connected to the pulse distribution circuit and arranged to move in unison while maintaining a constant positional relationship with respect to one another, each of the at least two tools having a current position and capable of being moved relative to a workpiece in accordance with one of the absolute positional command signals to subject the workpiece to a prescribed machining operation, said method comprising the steps of:
   (a) storing the current position of a first tool of the at least two tools in the current position register prior to machining the workpiece with the first tool;
   (b) moving the first tool to machine the workpiece in response to pulses from the pulse distribution circuit, the pulses being provided in accordance with the current position of the first tool indicated by the current position register and one of the absolute positional command signals;
   (c) computing the current position of a second tool of the at least two tools by the arithmetic means in response to one of the coordinate setting command signals;
   (d) storing the computed current position of the second tool in the current position register; and
   (e) moving the second tool to machine the workpiece in response to pulses from the pulse distribution circuit, the pulses being provided in accordance with the content of said current position register and one of the absolute positional command signals, whereby the workpiece is machined first by the first tool and then by the second tool.

2. The method according to claim 1, wherein said numerical control apparatus has a control axis in which the at least two tools move in a direction parallel thereto and step (c) further comprises the steps of:
   (i) receiving the incremental coordinate command signals including the constant positional relationship between the first and second tools, wherein the constant positional relationship is measured in increments in a direction parallel to the control axis;
   (ii) computing the current position of the second tool via the arithmetic means in accordance with the content of the current position register and the incremental coordinate command signals.

3. The method according to claim 1, wherein said numerical control apparatus has a memory and a control axis in which the at least two tools move in a direction parallel thereto, further comprising the steps of:
   before step (a), storing in the memory the constant positional relationship between the first and second tools, wherein the constant positional relationship is measured in increments in a direction parallel to the control axis; and step (c) further includes:
   computing, in response to receiving the incremental coordinate command signals and the content of the current position register, the current position of the second tool in accordance with the content of the current position register and the incremental coordinate command signals.

4. An apparatus for numerically controlling a machine tool operatively connectable to receive absolute positional command signals and absolute coordinate setting command signals, incremental coordinate command signals and machining program data, said machine tool having at least two tools arranged to move in unison while maintaining a constant positional relationship with respect to one another, each of the tools having a current position and being moved relative to a workpiece in accordance with one of the absolute positional and one of the coordinate setting command signals, to machine the workpiece in accordance with a prescribed machining operation defined by the machining program data, said apparatus comprising:
   a current position register for storing the current position of a first tool of the at least two tools;
   a pulse distributing circuit, operatively connected to the current position register and to the at least two tools, for executing a pulse distribution operation in response to the current position and one of the absolute positional command signals;
   computing means, operatively connected to the pulse distributing circuit and to the current position register, and operatively connected to receive the absolute and incremental coordinate command signals and absolute positional command signals, for computing the current position of one of the at least two tools in response to one of the absolute coordinate setting command signals and the incremental coordinate command signals, and for storing the computed position in the current position register; and instructing means, operatively connected to the computing means, for storing and providing the absolute positional and absolute coordinate setting command signals, the incremental coordinate command signals and the machining program data, wherein the workpiece is machined first by the first tool of the at least two tools and then by a second of the at least two tools.

5. An apparatus for numerically controlling a machine tool, operatively connectable to receive absolute positional and absolute coordinate setting command signals, incremental command signals, control signals and machining data, and having at least two tools being moved in unison while maintaining a constant positional relationship with respect to each other, each of the tools having a current position and being moved relative to a workpiece in accordance with one of the absolute positional signals and one of the coordinate setting command signals, to machine the workpiece in accordance with the machining data, said apparatus comprising:

first storing means, operatively connected to receive the absolute positional and absolute coordinate setting command signals, the incremental coordinate command signals and the machining data, for storing and for providing as outputs the absolute positional and absolute coordinate setting command signals, the incremental coordinate command signals and the machining data;

gating means, operatively connected to said first storing means and operatively connected to receive the control signals, for selectively providing, as a gated output, the outputs of said first storing means, in accordance with the control signals;

current position storing means, operatively connected to said gating means and to the at least two tools, for storing the current position of one of the at least two tools and for providing a first one of the control signals in response to the stored current position;

arithmetic means, operatively connected between said gate means and said current position storing means, for computing and providing the current position of one of the at least two tools in response to one of the absolute coordinate setting command signals and the incremental coordinate command signals; and pulse generating means, operatively connected to said gating means, said arithmetic means and said current position storing means, for providing pulses for moving the at least two tools and for providing a second one of the control signals in accordance with the selected gated output of said gating means and the current position of the one of the at least two tools provided by said arithmetic means.

6. An apparatus according to claim 5, further comprising decoding means, operatively connected to said gating means, said current position storing means, said arithmetic means and said pulse generating means, for providing outputs to said pulse generating means, said arithmetic means and said current position storing means in response to the absolute positional and absolute coordinate setting command signals and the incremental coordinate command signals, and for initiating said pulse generating means, said arithmetic means and said current position storing means.

7. An apparatus according to claim 6, wherein said gating means comprises:

counting means, operatively connected to receive the first and second control signals, for providing a select signal in response to the first and second control signals; and switching means, operatively connected to said storing means, said arithmetic means and said decoding means and operatively connected to receive the select signal, for selectively providing as an output one of the outputs of said first storing means in accordance with the select signal.

* * * * *

UNITED STATES PATENT AND TRADEMARK OFFICE
CERTIFICATE OF CORRECTION

PATENT NO. : 4,424,569
DATED : JANUARY 3, 1984
INVENTOR(S) : RYOJI IMAZEKI ET AL.

It is certified that error appears in the above-identified patent and that said Letters Patent is hereby corrected as shown below:

Col. 1, line 39, delete "with";

Col. 3, line 17, delete "the";
line 52, "G50X" should be --G50 X--.

Col. 4, line 24, "[X],[X]" should be --[X],[Z].

Col. 5, line 7, "the" should be --and--;
line 43, "in" should be --into--.

Col. 7, line 1, after "PS." insert --Following the present operation,--; and "The" should be --the--.

Signed and Sealed this

Twenty-fourth Day of April 1984

[SEAL]

Attest:

GERALD J. MOSSINGHOFF

*Attesting Officer*   *Commissioner of Patents and Trademarks*